United States Patent
Hegar et al.

(10) Patent No.: US 11,025,969 B1
(45) Date of Patent: Jun. 1, 2021

(54) VIDEO PACKAGING SYSTEM USING SOURCE ENCODING

(71) Applicant: Amazon Technologies, Inc., Seattle, WA (US)

(72) Inventors: Ryan Hegar, Happy Valley, OR (US); Kevin Moore, Portland, OR (US); Timur Darren Kiykioglu, Portland, OR (US)

(73) Assignee: Amazon Technologies, Inc., Seattle, WA (US)

(*) Notice: Subject to any disclaimer, the term of this patent is extended or adjusted under 35 U.S.C. 154(b) by 101 days.

(21) Appl. No.: 16/182,166

(22) Filed: Nov. 6, 2018

(51) Int. Cl.
  *H04N 21/236* (2011.01)
  *H04N 21/234* (2011.01)
  *H04N 21/2343* (2011.01)

(52) U.S. Cl.
  CPC . *H04N 21/23605* (2013.01); *H04N 21/23424* (2013.01); *H04N 21/23439* (2013.01)

(58) Field of Classification Search
  CPC .. H04N 19/184; H04N 19/44; H04N 21/2662; H04N 21/440218; H04N 21/23439; H04N 21/2402; H04N 21/2665; H04N 21/85406; H04N 21/8402; H04N 19/52; H04N 21/2387; H04N 21/44008; H04N 21/44245; H04N 19/146; H04N 21/234309; H04N 21/2383; H04L 65/60; H04L 65/607; H04L 65/4084; H04L 65/80; H04L 43/08; H04L 65/601
See application file for complete search history.

(56) References Cited

U.S. PATENT DOCUMENTS

| | | | | |
|---|---|---|---|---|
| 2009/0141894 A1* | 6/2009 | Sahdra | | H04N 21/4622 380/239 |
| 2011/0058474 A1* | 3/2011 | Nagapudi | | H04L 47/263 370/235 |
| 2012/0082213 A1* | 4/2012 | Sekiguchi | | H04N 19/53 375/240.02 |
| 2013/0132789 A1* | 5/2013 | Watford | | H04L 1/0041 714/752 |
| 2014/0359153 A1* | 12/2014 | Heng | | H04L 29/06517 709/231 |
| 2017/0118495 A1* | 4/2017 | Yang | | H04N 21/8456 |
| 2017/0289223 A1* | 10/2017 | Kipp | | H04L 65/1063 |

* cited by examiner

*Primary Examiner* — Hitesh Patel
(74) *Attorney, Agent, or Firm* — Knobbe, Martens, Olson & Bear, LLP

(57) ABSTRACT

A content streaming system and methodology for facilitating the management of content streaming. A content delivery service receives streaming content that is encoded according to an encoding profile. The content delivery service decodes the received encoded content and encodes the decoded content according to a plurality of encoding profiles. Additionally, the content delivery service reuses the received encoded content stream from the content provider.

20 Claims, 10 Drawing Sheets

VIDEO PACKAGING SYSTEM USING SOURCE ENCODING

BACKGROUND

Generally described, computing devices and communication networks can be utilized to exchange data and/or information. In a common application, a computing device can request content from another computing device via the communication network. For example, a user at a personal computing device can utilize a browser application to request a content page (e.g., a network page, a Web page, etc.) from a server computing device via the network (e.g., the Internet). In such embodiments, the user computing device can be referred to as a client computing device and the server computing device can be referred to as a content provider.

Content providers provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

Some content providers attempt to facilitate the delivery of requested content through the utilization of a video packaging and origination service provider. As with content providers, video packaging and origination service providers also provide requested content to client computing devices often with consideration of efficient transmission of the requested content to the client computing device and/or consideration of a cost associated with the transmission of the content. Accordingly, video packaging and origination service providers often consider factors such as latency of delivery and resource allocation in providing requested content.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
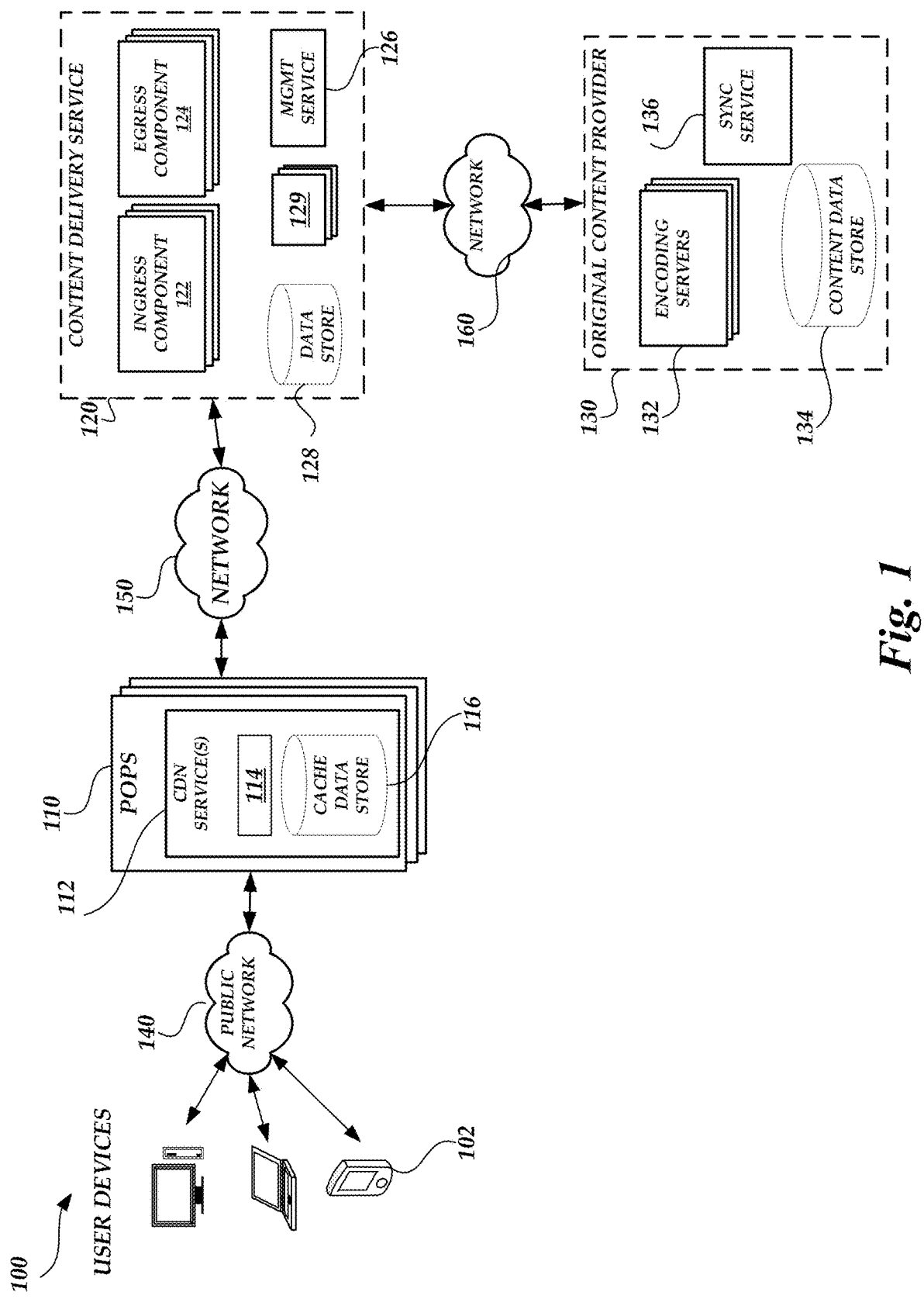
FIG. 1 is a block diagram of a content delivery environment that includes one or more user devices, a video packaging and origination service and an original content provider according to one embodiment.

Generally described, content providers can provide content to requesting users. With regard to video content, a content provider can implement a video packaging and origination service that is able to deliver video content to requesting users. Illustratively, a video packaging and origination service indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Real Time Messaging Protocol ("RTMP"), Smooth Streaming, and the like. Based on consumer demand, a video packaging and origination service can also provide advanced video transmission features such as just-in-time packaging of video content, digital rights management ("DRM") encryption, time-shifting, bitrate selection, catch up TV, and more.

In some embodiments, to deliver content, content providers can organize requested content, such as a video file, into multiple segments that are then transmitted to requesting devices, segment by segment. For example, in a video stream, each segment typically accounts for 2-10 seconds of video rendered on a receiving device. To provide content to the video packaging and origination service, individual content segments can be encoded by an encoder and transmitted to the video and origination service. Traditionally, a single processing node on the video packaging and origination service can receive an incoming stream of encoded segments or original encoded content for further processing.

Video segments can be encoded according to a defined bitrate and format, which generally defines the number of bits of data that are encoded over a measured amount of time and the specific software algorithm and resulting content representation format utilized to encode the data for transmission. For video files, bitrates are typically measured according to how many kilobits or megabits of data are processed over a second of time. By way of example, a data file that corresponds to 1 megabyte of video data encoded in one second would be considered to have an encoding bitrate of 8 mbps (e.g., 8 megabits per second) while a lower definition video file that corresponds to 45 kilobytes of video data processed in one second would be considered to have an encoding bitrate of 360 kbps (e.g., 360 kilobits per second).

In some embodiments, it may be possible for the content provider to facilitate variable bit rate encoding to enable for variances in the encoding bitrates of individual segments of a video file. In such embodiments, the content provider can generate multiple encoded bitrate versions or combinations of encoded bitrates and formats of individual video file segments. The content provider can then make at least a subset of the multiple bitrate encoded versions available to clients responsive to a request for a particular encoded bitrate version and format. Generally, a content provider can generate a catalog identifying the video segments and encoded bitrates for each identified video segment. The catalog can be written into a manifest file that is provided to individual client computing devices that have requested the video file. Thereafter, once all the versions of an encoded segment are received by the packaging and origination service, the packaging and origination service is available to receive and process requests for encoded content. More specifically, client computing devices, through a respective software application, can request individual video segments according to the available encoded bitrates and formats as published in the manifest file.

To receive content, a client computing device can simply request content having a fixed encoding rate or have a fixed encoding rate selected in response to a streaming content request. Such a fixed encoding rate approach can be deficient in facilitating variance of the encoding bitrate (both positive and negative) based on factors, such as network bandwidth, client computing device utilization, quality demands, and the like. In addition to the association of the encoding bitrate, video segments can be further defined by associating the encoding bitrate with the encoding format utilized by the encoder to generate the output stream. The encoding format can correspond to a content representation format for storage or transmission of video content (such as in a data file or bitstream). Examples of encoding formats include but not limited to the motion pictures expert group ("MPEG") MPEG-2 Part 2, MPEG-4 Part 2, H.264 (MPEG-4 Part 10), H.265 high efficiency video coding ("HEVC"), Theora, RealVideo RV40, VP9, and AOMedia Video 1 ("AV1"), and the like.

Traditionally, video packaging and origination services can maintain a single node or server, e.g., an ingress node, to receive incoming encoded content streams and decode the source encoded content. More specifically, the single node can operate as an ingress node to receive individual content streams or channels corresponding to source encoded segments encoded to a specific encoding profile (e.g., encoding bitrate and format). The individual content streams or channels are provided by an original content provider. The single node can utilize state information that facilitates determination that all encoding versions of the same encoded segment have been received.

To support adaptive bitrate encoding or streaming, the ingress node decodes the source encoded content into an unencoded format. Thereafter, the unencoded content is made available to one or more egress nodes, or encoders, that can process the decoded source content into one or more of the encoded content versions that will be available to requesting users. In some implementations, the encoded source content provided by the original content provider is encoded in a bitrate and format corresponding to a highest level of resolution that will be made available by the video packaging and origination service to provide the video packaging and origination service with subsequently decoded content with the least amount of artifacts or errors. Often, the encoding by the video packaging and origination service of the highest bitrate/format consumes the greatest amount of processing, memory and bandwidth resources for the encoding components of the video packaging and origination service. Such consumption of computing resources can require additional or alternative encoding components, can inject additional latencies in completing the content encoding, or divert processing resources that could have been utilized by a video packaging and origination service or content delivery service to improve the quality or speed in the encoding of the lower quality bitrate/formats.

To address at least a portion of the inefficiencies described above with regard to processing encoded content from content provider, aspects of the present application corresponding to a content delivery service for utilizing the video elementary stream data from the original encoded content. More specifically, aspects of the present application correspond to utilization of a bypass encoder function that facilitates the utilization of the original encoded content in place of re-encoding the decoded source content into the same format as the original encoded content. The ingress node can maintain the original encoded content and decode the encoded content for encoding lower resolution bitrate/format combinations. The ingress node can process the decoded content to further facilitate the combination of original encoded content encoded according to a "higher" encoding profile and subsequently encoded content encoded according to "lower" encoding profiles. Still further, in some embodiments, the content delivery service can provide information or request the modification of encoding parameters from the original content provider. By facilitating the re-sue of the original encoding content, the content delivery service can mitigate the amount of processing resources required to generate the set of encoded content segments to support adaptive bitrate encoding. Additionally, the content delivery service can further improve at least the timing, quality or efficiency of the lower resolution bitrate/formats.

FIG. 1 illustrates a general content delivery environment 100 for delivering content from original content providers to user devices. The content delivery environment 100 includes a plurality of devices 102 utilized by individual users, generally referred to as client computing devices, to request streaming or download content from a content delivery service 120. Illustratively, the content delivery service 120 can correspond to one or more services utilized in the transmission of the encoded content to user device 102. The content delivery service 120 can include a video packaging and origination service that indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Smooth Streaming, Real Time Messaging Protocol ("RTMP"), and the like. Based on consumer demand, a video packaging and origination service can also provide advanced video transmission features such as just-in-time packaging of video content, digital rights management ("DRM") encryption, time-shifting, bitrate selection, catch up TV, and more. The content can be illustratively provided by one or more origin sources, such as original content provider 130.

User computing devices 102 may include any number of different computing devices capable of communicating with the networks 140, 150, 160, via a direct connection or via an intermediary. For example, individual accessing computing devices may correspond to a laptop or tablet computer, personal computer, wearable computer, server, personal digital assistant (PDA), hybrid PDA/mobile phone, mobile phone, electronic book reader, set-top box, camera, appliance (e.g. a thermostat or refrigerator), controller, digital media player, watch, glasses, a home or car device, Internet of Thing ("IoT") devices, virtual reality or augmented reality devices, and the like. Each client computing device 102 may optionally include one or more data stores (not shown in FIG. 1) including various applications or computer-executable instructions, such as web browsers, used to implement the embodiments disclosed herein. Illustrative components of a user computing device 102 will be described with regard to FIG. 2.

In some embodiments, a CDN service provider 110 may include multiple edge locations from which a user device can retrieve content. Individual edge location 112 may be referred to herein as a point of presence ("POP"), where a POP is intended to refer to any collection of related computing devices utilized to implement functionality on behalf of one or many providers. POPs are generally associated with a specific geographic location in which the computing devices implementing the POP are located, or with a region serviced by the POP. As illustrated in FIG. 1, the POP 110 can include one or more metric information processing component 114 for processing metric information provided by client computing devices 102 and a data store 116 for maintain collected metric information. For example, a data center or a collection of computing devices within a data center may form a POP. In some instances, the POPs may implement one or more services, such as CDN services, data storage services, data processing services, etc. The CDN service provider 110 may include multiple POPs located in different geographic locations so that user devices can communicate with a nearby POP to retrieve content, thereby reducing the latency of delivering requested content.

Networks 140, 150, 160 may be any wired network, wireless network, or combination thereof. In addition, the networks 140, 150, 160 may be a personal area network, local area network, wide area network, cable network, fiber network, satellite network, cellular telephone network, data network, or combination thereof. In the example environment of FIG. 1, network 140 is a global area network (GAN), such as the Internet. Protocols and components for communicating via the other aforementioned types of communication networks are well known to those skilled in the art of computer communications and thus, need not be described in more detail herein. While each of the client computing devices 102 and video packaging and origination service 110 are depicted as having a single connection to the network 140, individual components of the client computing devices 102 and video packaging and origination service 110 may be connected to the network 130 at disparate points. Accordingly, communication times and capabilities may vary between the components of FIG. 1. Likewise, although FIG. 1 is illustrated as having three separate networks 140, 150, 160, one skilled in the relevant art will appreciate that the video packaging and origination service 110 may utilize any number or combination of networks.

In accordance with embodiments, for purposes of illustration, the content delivery service 120 includes one or more servers for receiving content from original content providers 130 and processing the content to make available a set of received encoded bitrate segments. The components of the content delivery service 120 may provide the encoded content to a separate stand-alone service, such as video packaging and origination service, for subsequent transmission to user devices 102 or a CDN service '110. In other embodiments, the illustrated components of the content delivery service 120 may integrated or form a part of a video packaging and origination service. Accordingly, the term content delivery service 120 may be generally variable and is not limited to any particular implementation.

As described in further detail below, the content delivery service 120 includes a plurality of ingress components 122 utilized to receive encoded data streams from encoding servers 132 from content providers 130. Illustratively, the ingress components 122 can process the incoming encoded content from the original content providers 130. The content delivery service 120 also includes one or more egress components 124 encoding decoding content into a bitrate and format for delivery to user devices. Additionally, in some embodiments, at least some of the egress components 124 may be configured to utilize the encoded source content in lieu of encoding decoded source content, generally referred to as bypass encoding. The ingress components 122 and egress components 124 may be distributed according to geographic criteria or availability zones to facilitate delivery or access to encoded content.

The content delivery service 120 can further include management services 126 for generating synchronization information utilized by the encoders, such as sequence numbers corresponding to the set of encoded segments, time stamp information related to a relative time of the encoded segments or from which relative time of encoded segments will be based, and the like. The management services 126 can control the generation or instantiation of additional ingress and egress components or the generation of the indices utilized to identify content. Still further, the video packing and origination service 120 can include a plurality of cache components 129 that maintain encoded content in one or more distinct availability zones, such as different geographic areas or zones. The content delivery service 120 can further include a data store 128 for maintaining received encoded data for transmission.

It will be appreciated by those skilled in the art that the content delivery service 120 may have fewer or greater components than are illustrated in FIG. 1. Thus, the depiction of the content delivery service 120 in FIG. 1 should be taken as illustrative. For example, in some embodiments, components of the content delivery service 120 may be executed by one more virtual machines implemented in a hosted computing environment. A hosted computing environment may include one or more rapidly provisioned and released computing resources, which computing resources may include computing, networking or storage devices. Still further, aspects of the present application relate to the selection of individual ingress servers 122, egress servers 124 and local cache components 129 based on attributes of the components, such as geographic information, logical network information, and the like. Accordingly, while such components are illustrated as logically being logically grouped in FIG. 1, one skilled in the relevant art will appreciate that one or more aspects of the present application can include the content delivery service 120 as being implemented in multiple geographic areas. Additionally, not all geographic areas hosting portions of the content delivery service 120 will necessary have all the same components or combination of components.

With continued reference to FIG. 1, the content delivery environment 100 also includes original content providers 130. Illustratively, the original content provider can include a plurality of encoders 132 for generating multiple encoded streams for transmission to the content delivery service 120. In one embodiment, individual encoders may generate different encode versions of a content segment according to a different encoding profile. The original content provider 130 can also include logic or other management components for determining how many encoders 132 should be utilized or how to manage the addition or removal of encoders. In some embodiments, the original content provider the original content provider 130 can further include synchronization services 136 for generating synchronization information utilized by the encoders, such as sequence numbers corresponding to the set of encoded segments, time stamp information related to a relative time of the encoded segments or from which relative time of encoded segments will be based, and the like. The content delivery service 120 can further include a data store 134 for maintaining encoded data for transmission. The synchronization services 124 and 136 may work in conjunction or in a complimentary basis, such as to modify the encoding of source content utilized in bypass encoding embodiments.

Figure 2:
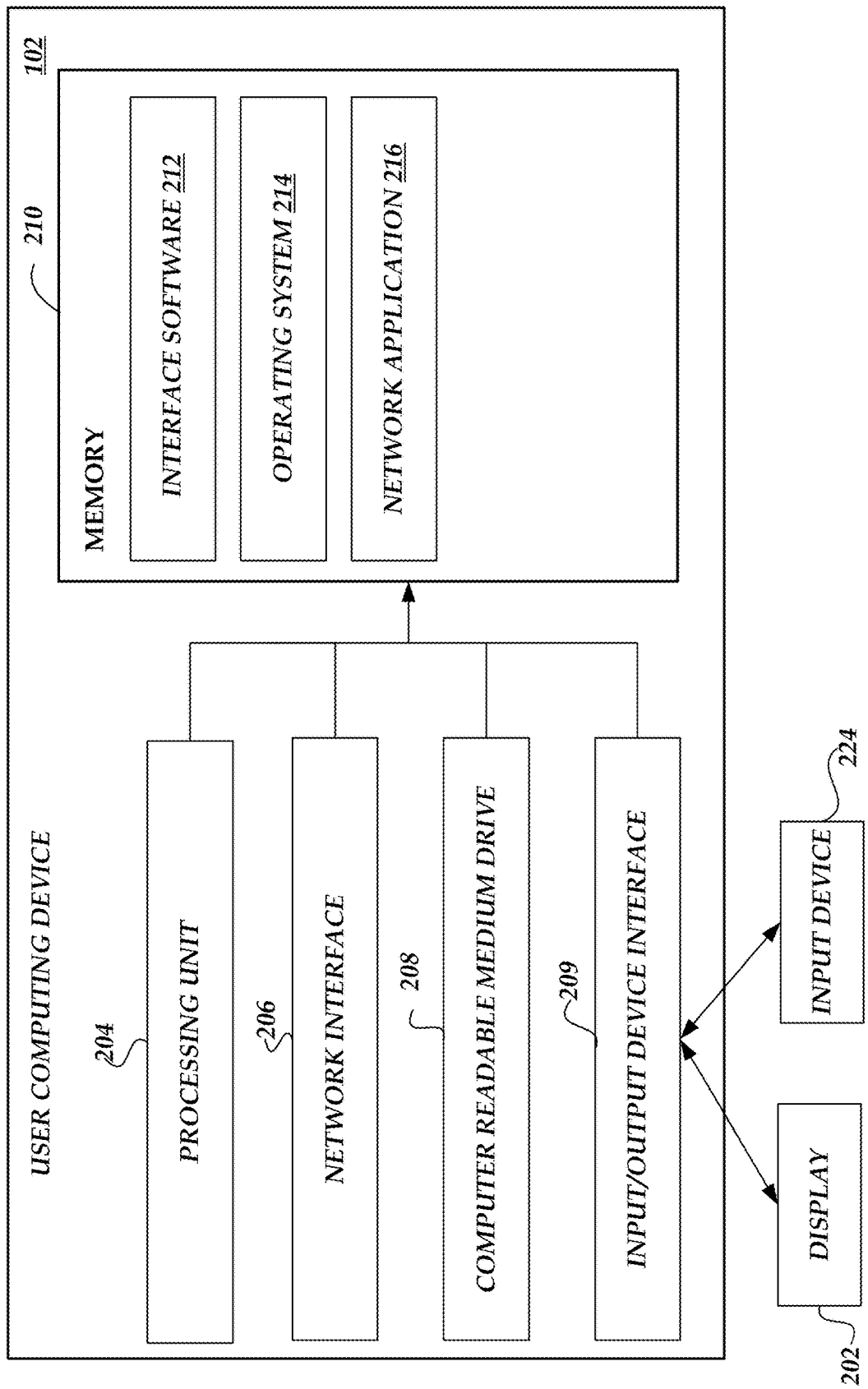
FIG. 2 is a block diagram of illustrative components of a user computing device configured to remotely process content in accordance with an illustrative embodiment.

FIG. 2 depicts one embodiment of an architecture of an illustrative user computing device 102 that can generate content requests and process metric information in accordance with the present application. The general architecture of the user computing device 102 depicted in FIG. 2 includes an arrangement of computer hardware and software components that may be used to implement aspects of the present disclosure. As illustrated, the user computing device 102 includes a processing unit 204, a network interface 206, an input/output device interface 209, an optional display 202, and an input device 224, all of which may communicate with one another by way of a communication bus.

The network interface 206 may provide connectivity to one or more networks or computing systems, such as the network 140 of FIG. 1 and the content delivery service 120 or the original content provider 130. The processing unit 204 may thus receive information and instructions from other computing systems or services via a network. The processing unit 204 may also communicate to and from memory 210 and further provide output information for an optional display 202 via the input/output device interface 209. The input/output device interface 209 may also accept input from the optional input device 224, such as a keyboard, mouse, digital pen, etc. In some embodiments, the user computing device 102 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the user computing device 102. The memory 210 may further include computer program instructions and other information for implementing aspects of the present disclosure. For example, in one embodiment, the memory 210 includes a network application 216, such as browser application or media player, for accessing content and communicating with the content delivery service 120.

Figure 3:
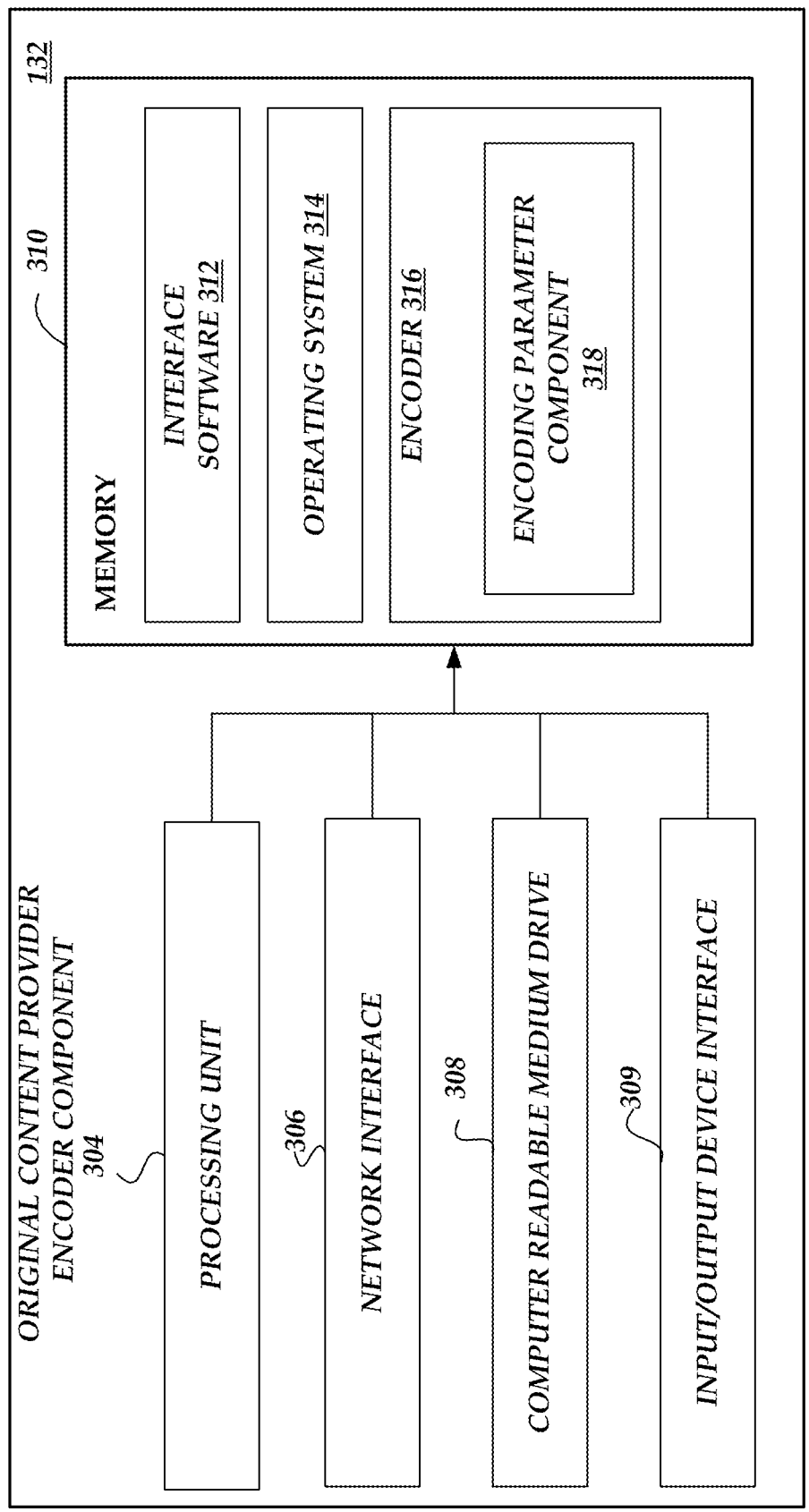
FIG. 3 is a block diagram of illustrative components of an encoder component configured to generate source encoded content in accordance with an illustrative embodiment.

FIG. 3 depicts one embodiment of an architecture of an illustrative server for encoding content from an original content provider 130 as described herein. The general architecture of the encoder 132 depicted in FIG. 3 includes an arrangement of computer hardware and software components that may be used to implement aspects of the present disclosure. As illustrated, the encoder 132 includes a processing unit 304, a network interface 306, a computer readable medium drive 308, an input/output device interface 309, all of which may communicate with one another by way of a communication bus. The components of the encoder 132 may be physical hardware components or implemented in a virtualized environment.

The network interface 306 may provide connectivity to one or more networks or computing systems, such as the network 150 or network 160 of FIG. 1. The processing unit 304 may thus receive information and instructions from other computing systems or services via a network. The processing unit 304 may also communicate to and from memory 310 and further provide output information for an optional display via the input/output device interface 309. In some embodiments, the encoder 132 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the content delivery service 120. The memory 310 may further include computer program instructions and other information for implementing aspects of the present disclosure. For example, in one embodiment, the memory 310 includes interface software 312 for receiving and processing content requests from the video packaging and origination services 120.

Additionally, the memory 310 includes an encoder component 316 for processing content segments. Additionally, the encoder component 316 can further include an encoding parameter component 318 for utilizing the synchronization or other configure information in the encoding process to increase the likelihood that encoded segments from the original content provider 130 can be utilized by a content delivery service 120, including via the bypass encoding. For example, the encoder component 316 can adjust the encoding process to adjust for the insertion or overlay of advertisement content or for support of other features, such as closed captioning or open captioning.

Figure 4:
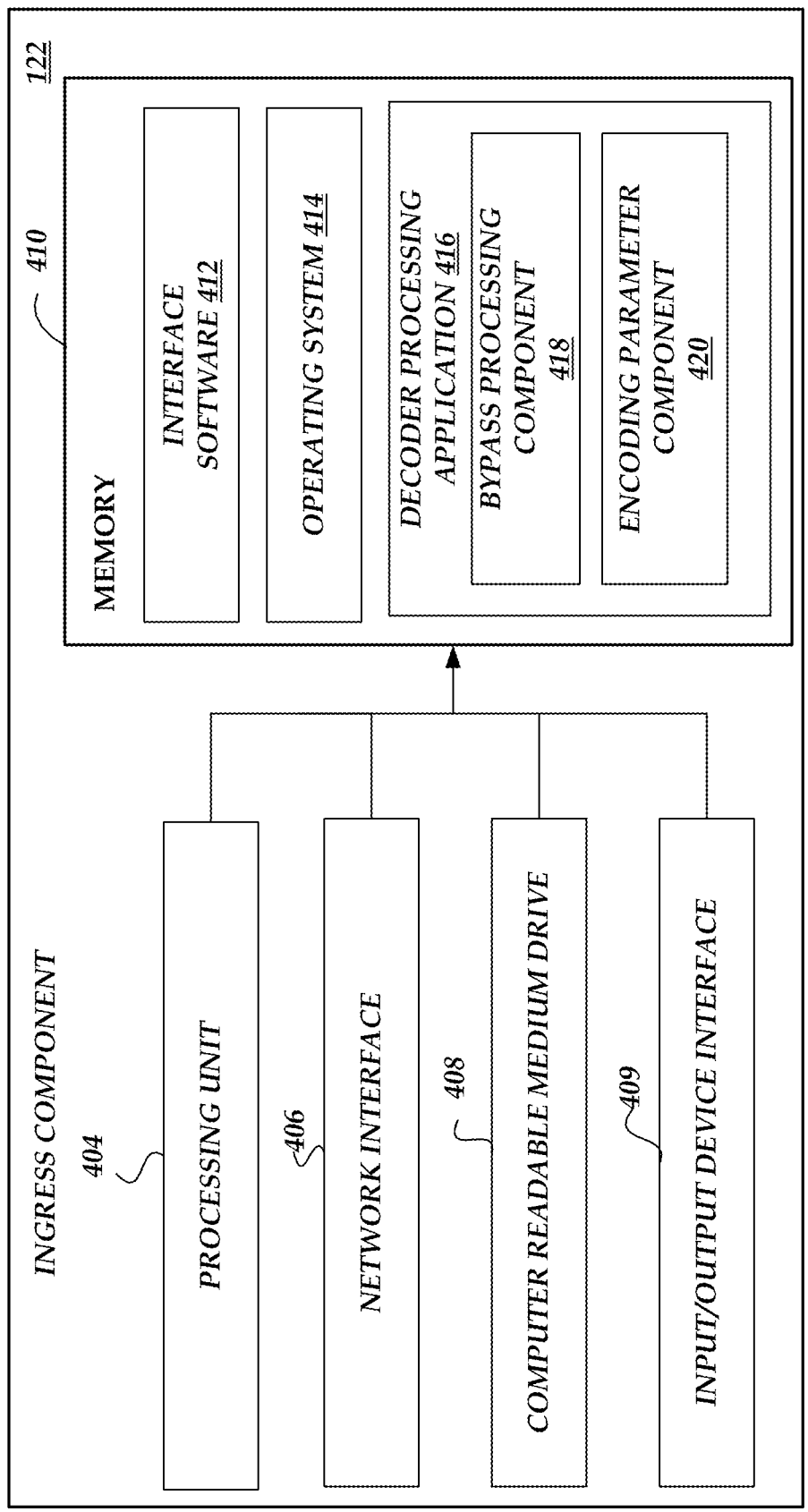
FIG. 4 is a block diagram of illustrative components of an ingress node configured to manage source encoding content in accordance with an illustrative embodiment.

FIG. 4 depicts one embodiment of an architecture of an illustrative server for functioning as an ingress component 122 as described herein. As described above, the content delivery service 120 includes multiple ingress components 122 (or nodes) that facilitate intake of encoded segments from the original content provider 130. The general architecture of the ingress component 122 depicted in FIG. 4 includes an arrangement of computer hardware and software components that may be used to implement aspects of the present disclosure. As illustrated, the ingress component 122 includes a processing unit 404, a network interface 406, a computer readable medium drive 408, an input/output device interface 409, all of which may communicate with one another by way of a communication bus. The components of the ingress component 122 may be physical hardware components or implemented in a virtualized environment.

The network interface 406 may provide connectivity to one or more networks or computing systems, such as the network 150 or network 160 of FIG. 1. The processing unit 404 may thus receive information and instructions from other computing systems or services via a network. The processing unit 404 may also communicate to and from memory 410 and further provide output information for an optional display via the input/output device interface 409. In some embodiments, the ingress component 122 may include more (or fewer) components than those shown in FIG. 4.

The memory 410 may include computer program instructions that the processing unit 404 executes in order to implement one or more embodiments. The memory 410 generally includes RAM, ROM, or other persistent or non-transitory memory. The memory 410 may store an operating system 414 that provides computer program instructions for use by the processing unit 404 in the general administration and operation of the ingress node. The memory 410 may further include computer program instructions and other information for implementing aspects of the present disclosure. For example, in one embodiment, the memory 410 includes interface software 412 for receiving and processing content from encoders 132. Additionally, the memory 410 includes an encoder processing application 416 for processing incoming encoded content segments and generating decoded content for subsequent encoding by one or more encoders 124 associated with the content delivery service 120. The ingress component 122 can further include a bypass processing component 418 for determining when encoded content from the content provider encoder 132 can be utilized in a bypass encoding function and for facilitating the preserving of the encoded content. Still further, the ingress component 122 can also include an encoding parameter component 420 for controlling the encoding parameters of the encoders 124 associated with content delivery service 120.

Figure 5:
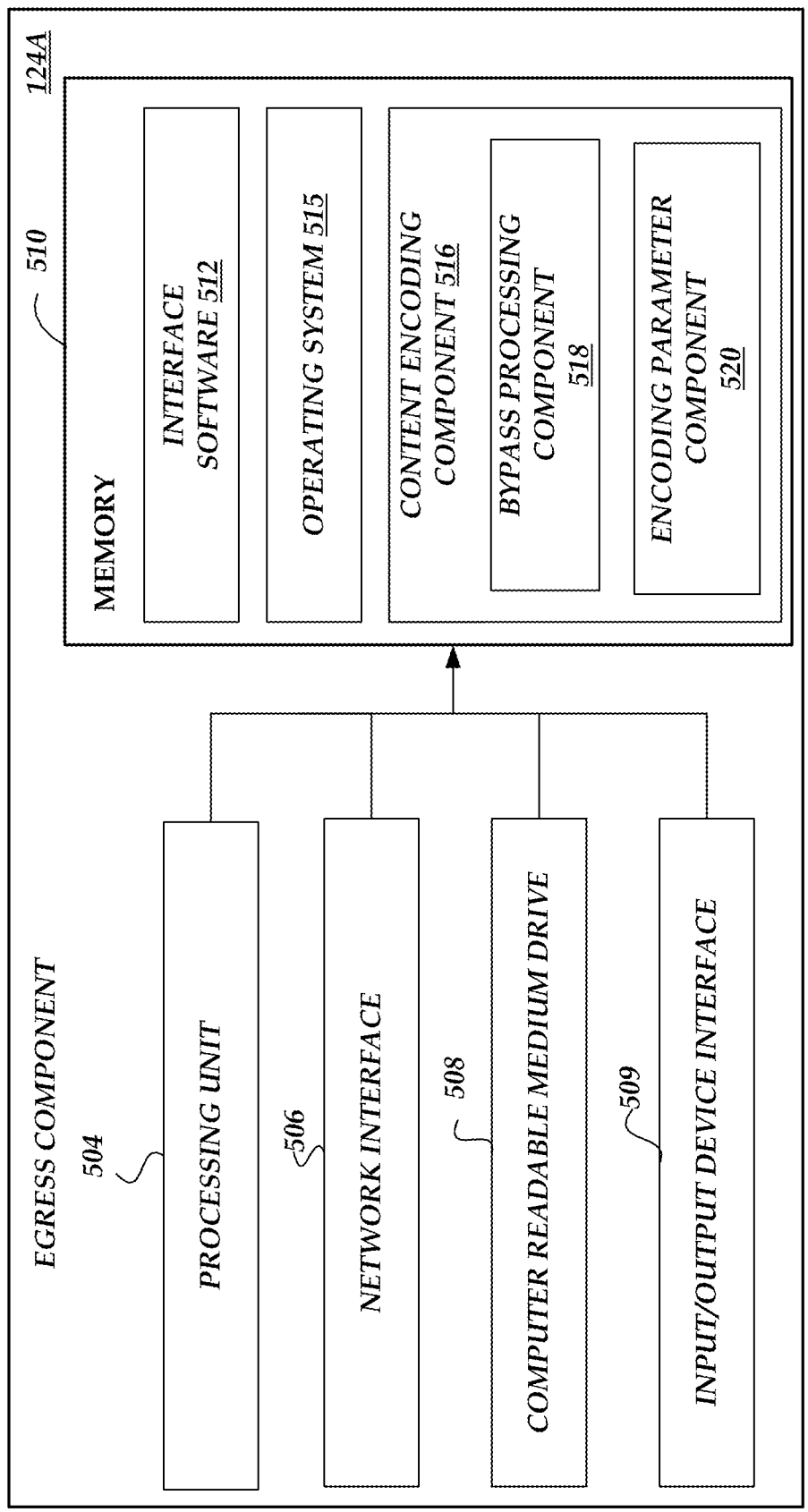
FIG. 5 is a block diagram of illustrative components of an egress node configured to utilize source encoded content in accordance with an illustrative embodiment.

FIG. 5 depicts one embodiment of an architecture of an illustrative server for functioning as an egress component 124 as described herein, specifically illustrated egress component 124A. As described above, the content delivery service 120 includes multiple egress components 124 (or nodes) that facilitate intake of decoded content and generating encoded content segments to be outputted by the video packaging and origination service 102. The general architecture of the egress component 124 depicted in FIG. 5 includes an arrangement of computer hardware and software components that may be used to implement aspects of the present disclosure. As illustrated, the egress component 124 includes a processing unit 504, a network interface 506, a computer readable medium drive 508, an input/output device interface 509, all of which may communicate with one another by way of a communication bus. The components of the egress component 124 may be physical hardware components or implemented in a virtualized environment.

The network interface 506 may provide connectivity to one or more networks or computing systems, such as the network 150 or network 160 of FIG. 1. The processing unit 504 may thus receive information and instructions from other computing systems or services via a network. The processing unit 504 may also communicate to and from memory 510 and further provide output information for an optional display via the input/output device interface 509. In some embodiments, the egress component 124 may include more (or fewer) components than those shown in FIG. 5.

The memory 510 may include computer program instructions that the processing unit 504 executes in order to implement one or more embodiments. The memory 510 generally includes RAM, ROM, or other persistent or non-transitory memory. The memory 510 may store an operating system 514 that provides computer program instructions for use by the processing unit 504 in the general administration and operation of the egress component 124. The memory 510 may further include computer program instructions and other information for implementing aspects of the present disclosure. For example, in one embodiment, the memory 510 includes interface software 512 for receiving and processing content requests from requesting entities. Additionally, the memory 510 includes a bypass processing component 516 for processing received original encoded content segments from the ingress node 122 and outputting the original encoded content segments in lieu of re-encoding the content. Additionally, the egress component 124 can further include an encoding parameter component 520 for generating the encoded content according to common parameters for embodiments in which the bypass functionality is not utilized.

Figure 6:
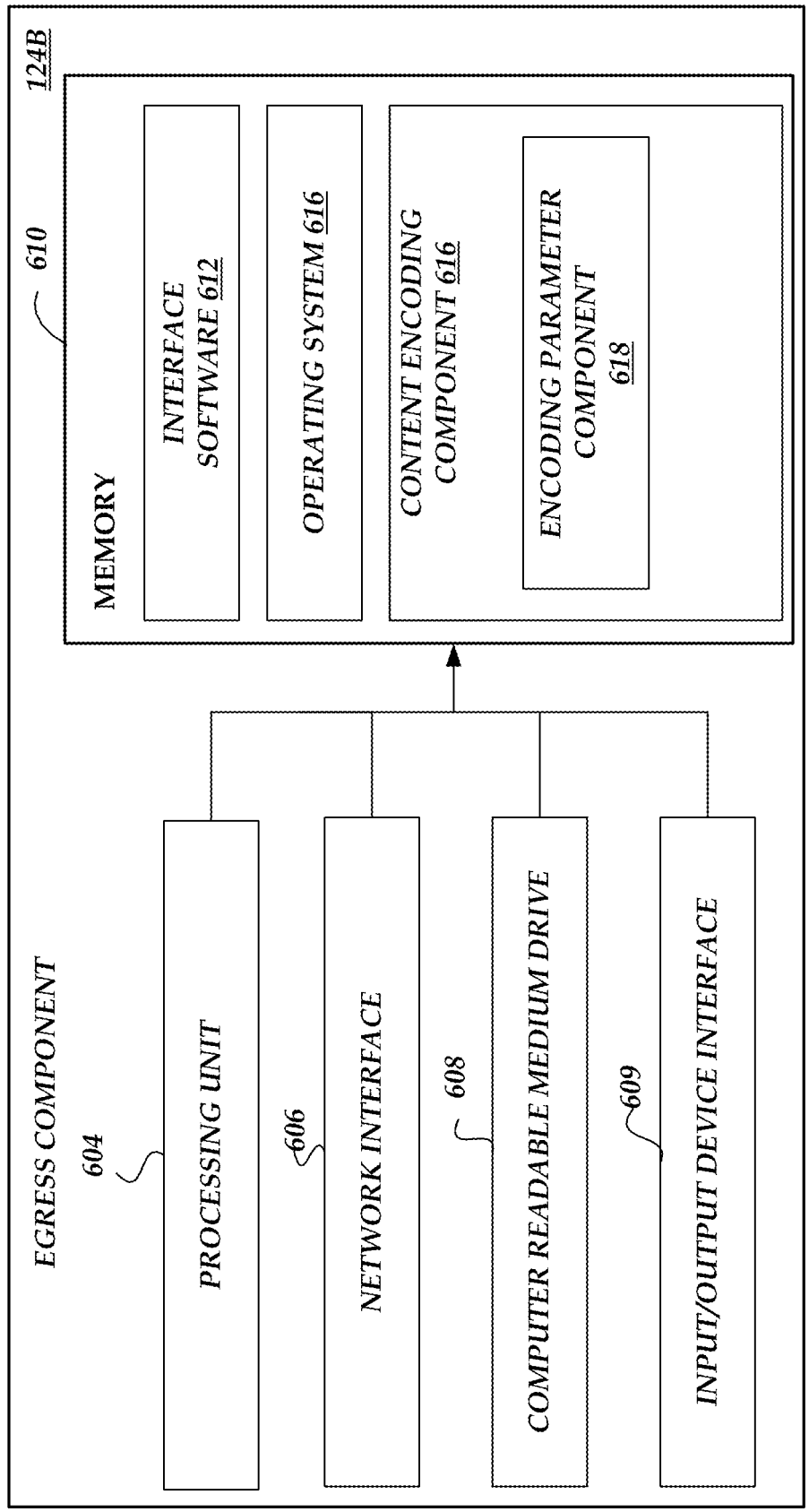
FIG. 6 is a block diagram of illustrative components of an egress node configured to utilize source encoded content in accordance with an illustrative embodiment.

FIG. 6 depicts one embodiment of an architecture of an illustrative server for functioning as an egress component 124 as described herein, specifically illustrated as egress component 124B. As described above, the content delivery service 120 includes multiple egress components 124 (or nodes) that facilitate intake of decoded content and generating encoded content segments to be outputted by the video packaging and origination service 102. The general architecture of the egress component 124B depicted in FIG. 6 includes an arrangement of computer hardware and software components that may be used to implement aspects of the present disclosure. As illustrated, the egress component 124 includes a processing unit 604, a network interface 606, a computer readable medium drive 608, an input/output device interface 609, all of which may communicate with one another by way of a communication bus. The components of the egress component 124 may be physical hardware components or implemented in a virtualized environment.

The network interface 606 may provide connectivity to one or more networks or computing systems, such as the network 150 or network 160 of FIG. 1. The processing unit 604 may thus receive information and instructions from other computing systems or services via a network. The processing unit 604 may also communicate to and from memory 610 and further provide output information for an optional display via the input/output device interface 609. In some embodiments, the egress component 124 may include more (or fewer) components than those shown in FIG. 6.

The memory 610 may include computer program instructions that the processing unit 604 executes in order to implement one or more embodiments. The memory 610 generally includes RAM, ROM, or other persistent or non-transitory memory. The memory 610 may store an operating system 614 that provides computer program instructions for use by the processing unit 604 in the general administration and operation of the egress component 124. The memory 610 may further include computer program instructions and other information for implementing aspects of the present disclosure. For example, in one embodiment, the memory 610 includes interface software 612 for receiving and processing content requests from requesting entities. Additionally, the egress component 124B can further include an encoding parameter component 618 for generating the encoded content according to common parameters. In the example illustrated in FIG. 6, the egress component 124B may be configured in a manner such that bypass functionality cannot be implemented by the egress component 124B.

Figure 7A:
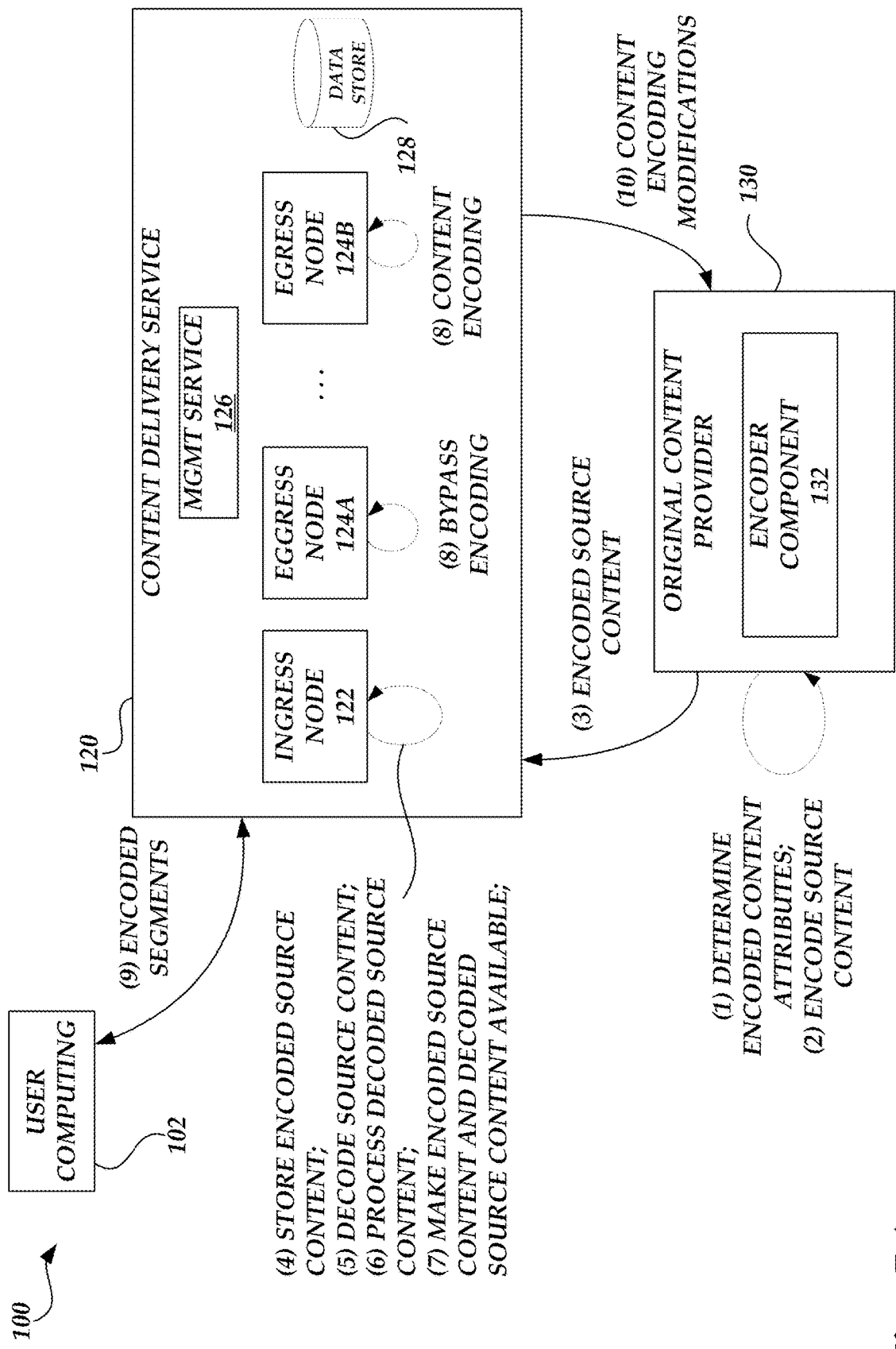
FIGS. 7A and 7B are block diagrams of the content delivery environment of FIG. 1 illustrating the interaction related to video packing and origination service for obtaining encoded content for delivery to user devices.
Figure 7B:
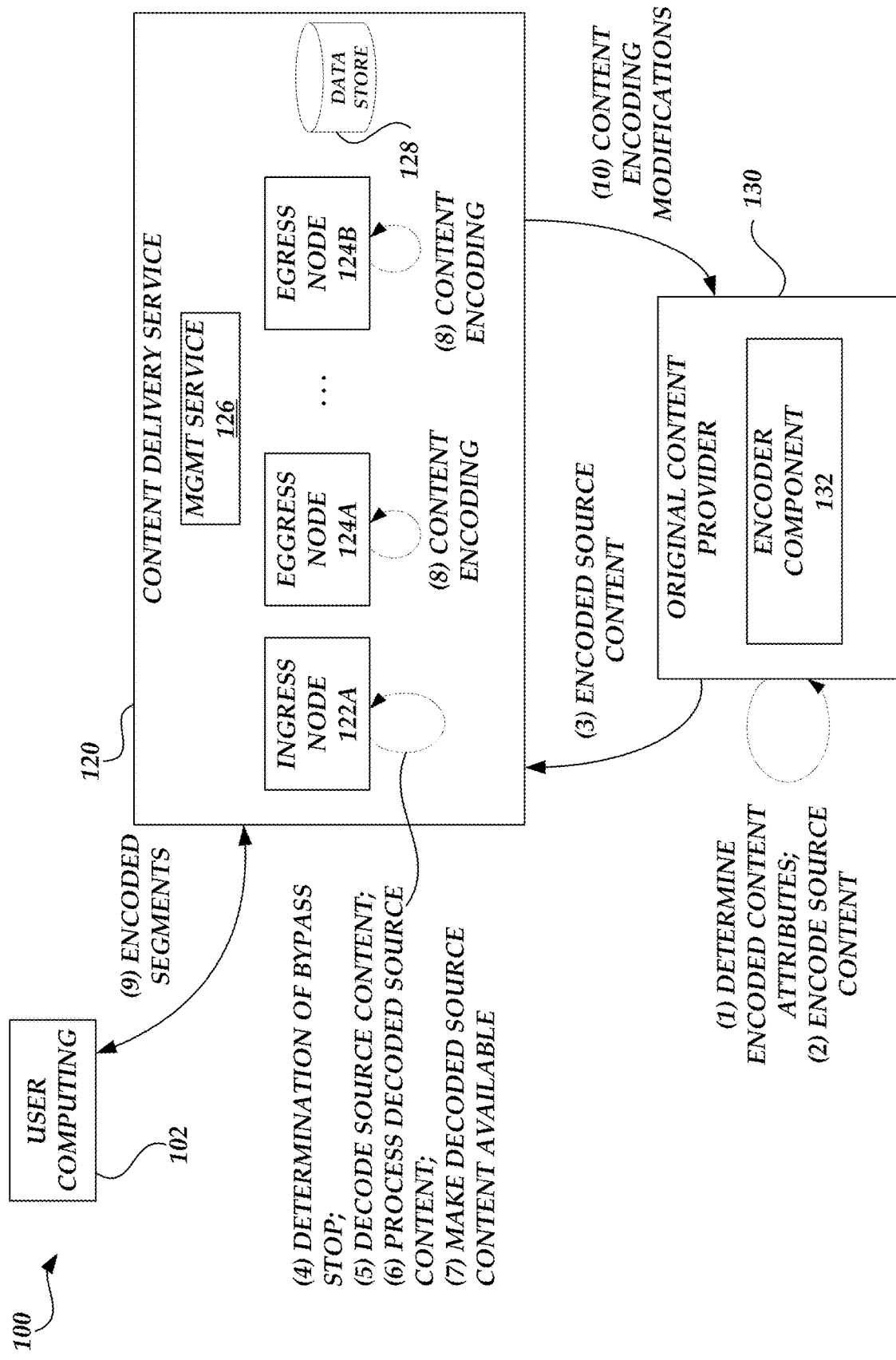

Turning now to FIGS. 7A and 7B, an illustrative interaction for the processing of encoded content from the original content provider 130 to generate a set of encoded content according to different bitrate and format combinations will be described will be described. With reference first to FIG. 7A, at (1), the original content provider 130 determines one or more encoded content parameters for the original content. Illustratively, encoders can be configured with any one of a variety of encoding parameters that are specified in accordance with the encoding format. Such encoding parameters can be varied in accordance with the specifications of the format, which may result in differences in the encoded content such as size of the encoded content, quality of the encoded content, reduction of artifacts, etc. The encoding parameters can also include synchronization information, such as timestamp or sequence number information that is utilized to keep the encoded content transmitted by the content delivery service 120 synchronized. Still further, the encoding parameters can further include markers, such as instantaneous decoder refresh "IDR" or other information, that facilitates the addition of supplemental content by a video packaging and origination service. Illustratively, the format and bitrate for the encoded content corresponds to at least the highest bitrate that will be provided by the video packaging and origination service. At (2), the original content provider 130 causes one or more encoders 132 to generate encoded streams based on the encoding parameters information.

At (3), the original content provider 130 transmits the original encoded content to the content delivery service 120. The content delivery service 120 receives and processes the original encoded content from the original content provider 130. More specifically, at (4), the ingress node 122 stores the original encoded content by causing the video elementary data from the original encoded content to be stored. As will be explained in greater detail, by preserving the original encoded content, the ingress node 122 can facilitate a bypass functionality for an egress node 124.

At (5), the ingress node 122 decodes the original encoded content into a decoded or unencoded format for use by other egress nodes 124. The ingress node 122 can store the decoded content in a store location or transmit the decoded content to a set of egress node 124. At (6), the ingress node 122 processes the decoded source content. Illustratively, if each bitrate format encoding is performed at the content delivery service 120, the encoders can share synchronization information to ensure that the instantaneous decoder refresh frames occur in the same input frame. In embodiments in which at least one encoder is utilizing bypass functionality, the IDRs for the lower resolution encodings should align with the IDRs found in the original encoded source content. In another example, the ingress node 122 can add supplemental content, such as advertisements, where markers are present in the unencoded content.

At (7), the ingress node 122 makes the unencoded and encoded content available for encoding. For example, the ingress node 122 can store or cache the unencoded or original encoded content. At (8), a first encoder, encoder 124A, can utilize the original encoded content source to implement bypass functionality that reuses the original encoded content. In some embodiments, the encoder 124A can further process the original encoded content, such as to add embed captioning information or support burn-in information. Additionally, a second (and additional) encoder 124B can utilize the unencoded content to encode lower resolution bitrate format combinations.

At (9), the content delivery service 120 provides encoded content segments to the user computing device 102 or otherwise makes the encoded content available. In some embodiments, the content delivery service 120 can also provide feedback or modifications to the original content provider 130 to modify the source encoding formation. For example, the video packaging and origination service 130 can modify an encoding parameter utilized by the encoder component 132 or provide additional markers or requests. At (10), the content delivery service 120 transmits the encoding modifications to the original content provider 130.

With reference now to FIG. 7B, in some embodiments, the content delivery service 120 may determine to cease utilizing the bypass functionality. Illustratively, the determination of when to stop implementing bypassing functionality can occur various times including prior to receiving content streams, during the transmission of content stream, or after specific milestones or events. original encoded original encoded content delivery service 120 Illustratively, FIG. 7B illustrates the determination of the cases of bypass functionality, generally referred to as a bypass stop, during the transmission of content from the original content provider 130.

At (1), the original content provider 130 determines one or more encoded content parameters for the original content. Illustratively, encoders can be configured with any one of a variety of encoding parameters that are specified in accordance with the encoding format. Such encoding parameters can be varied in accordance with the specifications of the format, which may result in differences in the encoded content such as size of the encoded content, quality of the encoded content, reduction of artifacts, etc. The encoding parameters can also include synchronization information, such as timestamp or sequence number information that is utilized to keep the encoded content transmitted by the content delivery service 120 synchronized. Still further, the encoding parameters can further include markers, such as instantaneous decoder refresh "IDR" or other information, that facilitates the addition of supplemental content by a video packaging and origination service. Illustratively, the format and bitrate for the encoded content corresponds to at least the highest bitrate that will be provided by the video packaging and origination service. At (2), the original content provider 130 causes one or more encoders 132 to generate encoded streams based on the encoding parameters information.

At (3), the original content provider 130 transmits the original encoded content to the content delivery service 120. The content delivery service 120 receives and processes the original encoded content from the original content provider 130.

At (4), the ingress node 122 may determine to stop the bypass functionality of the encoder 124A. Such a determination may be made based on a determination that the original encoded content is not meeting one or more thresholds, such as quality thresholds, compression thresholds, number of artifacts or other measurable attributes of the original encoded content segments. In another embodiment, the ingress node 122 may determine that the lower quality encoded content is not compatible with the original encoded content. In still a further embodiment, the ingress node 122 may determine that original encoded content may require additional processing, such as embedding captioning or other supplemental content, that will not allow the content delivery service 120 to reuse the original encoded content.

At (5), the ingress node 122 decodes the original encoded content into a decoded or unencoded format for use by other egress nodes 124. The ingress node 122 can store the decoded content in a store location or transmit the decoded content to a set of egress node 124. At (6), the ingress node 122 processes the decoded source content. Illustratively, if each bitrate format encoding is performed at the content delivery service 120, the encoders can share synchronization information to ensure that the instantaneous decoder refresh frames occur in the same input frame. In embodiments in which at least one encoder is utilizing bypass functionality, the IDRs for the lower resolution encodings should align with the IDRs found in the original encoded source content. In another example, the ingress node 122 can add supplemental content, such as advertisements, where markers are present in the unencoded content.

At (7), the ingress node 122 makes the unencoded content available for encoding. For example, the ingress node 122 can store or cache the unencoded or original encoded content. At (8), a first and second encoder, encoder 124A and 124B, can utilize the unencoded content to encode lower resolution bitrate format combinations.

At (9), the content delivery service 120 provides encoded content segments to the user computing device 102 or otherwise makes the encoded content available. In some embodiments, the content delivery service 120 can also provide feedback or modifications to the original content provider 130 to modify the source encoding formation. For example, the video packaging and origination service 130 can modify an encoding parameter utilized by the encoder component 132 or provide additional markers or requests. At (10), the content delivery service 120 transmits the encoding modifications to the original content provider 130.

Figure 8:
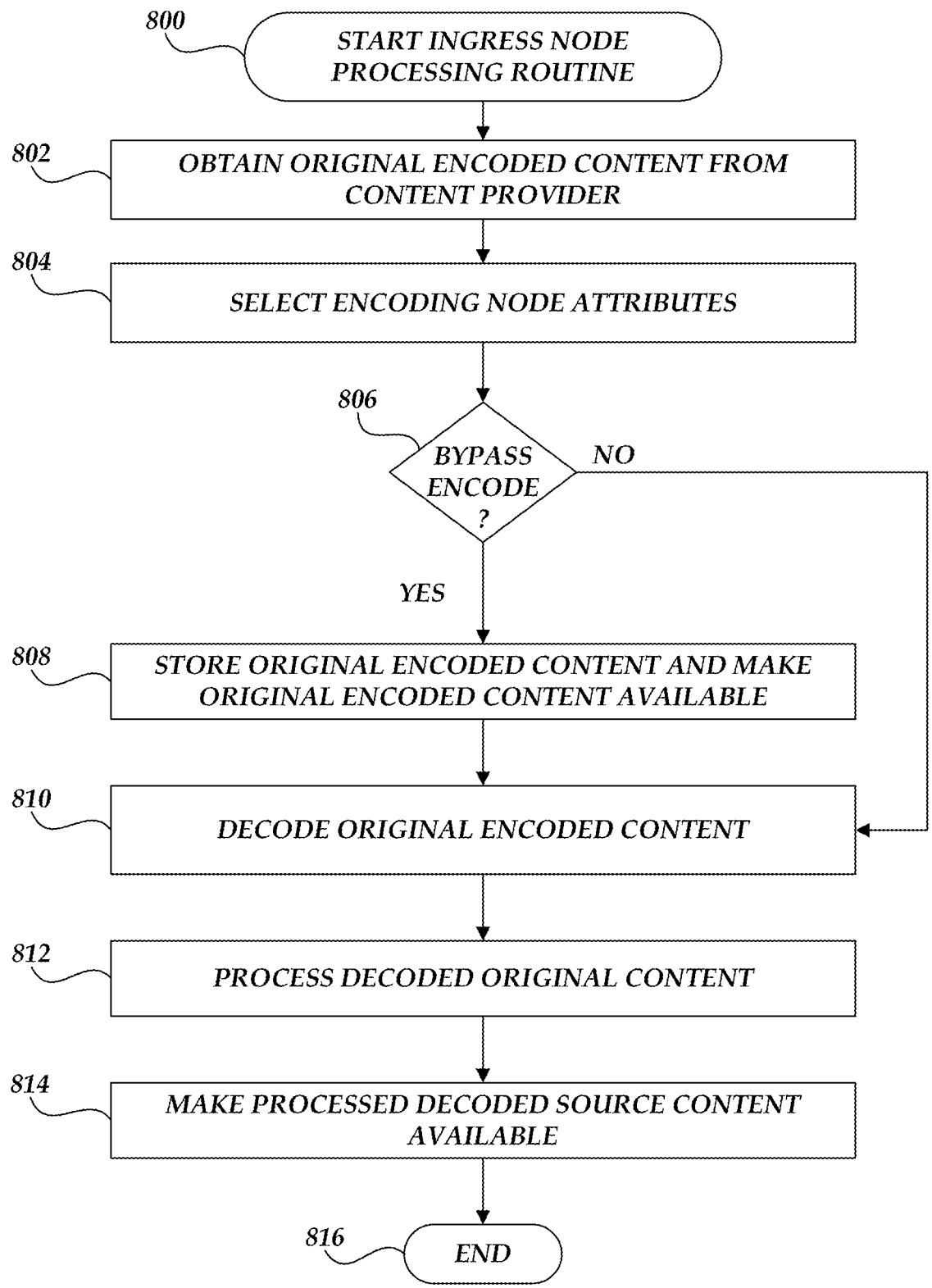
FIG. 8 is a flow diagram illustrative of an ingress component routine implemented by a video packaging and origination service.

Turning now to FIG. 8, a routine 800 utilized by the content delivery service 120 for processing incoming original encoded content will be described. Illustratively, routine 800 may be implemented by an ingress node 122 of the content delivery service 120. Illustratively, routine 800 will begin once the original content provider 130 begins transmitting encoded content streams to the content delivery service 120.

At block 802, the content delivery service 120 obtains content stream data from an original content provider 130. As described above, the content stream data (e.g., the original encoded content) may be transmitted by the original content provider 130 responsive to a request from a user device 102, a request from the content delivery service 120, or other request/trigger. Illustratively, the original content provider 130 determines one or more encoded content parameters for the original encoded content, which is encoded according to an encoding profile. Illustratively, encoders can be configured with any one of a variety of encoding parameters that are specified in accordance with the encoding format. Such encoding parameters can be varied in accordance with the specifications of the format, which may result in differences in the encoded content such as size of the encoded content, quality of the encoded content, reduction of artifacts, etc. The encoding parameters can also include synchronization information, such as time-stamp or sequence number information that is utilized to keep the encoded content transmitted by the content delivery service 120 synchronized. Still further, the encoding parameters can further include markers, such as instantaneous decoder refresh "IDR" or other information, that facilitates the addition of supplemental content by a video packaging and origination service. Illustratively, the format and bitrate for the encoded content corresponds to at least the highest bitrate that will be provided by a video packaging and origination service, such as to support adaptive bitrate streaming.

At block 804, the ingress node 122 selects the encoding node attributes. Illustratively, the encoding node attributes can include the identification of the bitrate encoding combinations that will be produced by one or more egress nodes, or encoding nodes, and whether bypass functionality will be implemented by at least one egress node, or encoding node. Additionally, the encoding node attributes can include a determination of additional processing that will be applied to either the encoded or decoded original content, such as close captioning, overlays, or insertion of supplemental content will be provided.

At decision block 806, a test is conducted to determine whether bypass functionality should be implemented. In one embodiment, the determination of bypass functionality can be based on a configuration of the ingress node or content delivery service 120. In another embodiment, the determination of whether bypass functionality will be implemented can be based on the evaluation of criteria. In one example, the content delivery service 120 can collect or measure quality metrics associated with the original encoded content, including the measurement of frame losses, user perceptible artifacts, and the like. If the quality metrics do not meet a minimum or otherwise exceed established thresholds, the ingress node 122 can determine to not implement bypass functionality. In a further example, the content delivery service 120 can determine encoding efficiencies or capacity to encode the highest bitrate profile or otherwise attribute a cost to the encoding process. Based on the efficiencies, capacity or attributed cost, the content delivery service or ingress node 122 can determine whether to reuse the original encoded content by implementing bypass functionality. In yet another example, the content delivery service 120 may receive configuration instructions from the original content provider 130, video packaging and origination service, user, administrator, etc. that specifies whether bypass functionality should be specified or established criteria for dynamically determining whether bypass functionality should be implemented.

If bypass functionality should be implemented, at block 808, the ingress node 122 stores the original encoded content by causing the video elementary data (e.g., the encoded original content) from the original encoded content to be stored and made available for use by an encoder implementing bypass functionality. As will be explained in greater detail, by preserving the original encoded content, the ingress node 122 can facilitate a bypass functionality for an egress node 124. Alternatively, if no bypass functionality is implemented, routine 800 can proceed to block 808.

At block 810, the ingress node 122 decodes the original encoded content into a decoded or unencoded format for use by egress nodes 124 to subsequently encode the unencoded content according to one or more additional encoding profiles, such as the encoding profiles utilized to support adaptive bitrate streaming. The ingress node 122 can store the decoded content in a store location or transmit the decoded content to a set of egress node 124. At block 812, the ingress node 122 processes the decoded source content. Illustratively, if each bitrate format encoding is performed at the content delivery service 120, the encoders can share synchronization information to ensure that the instantaneous decoder refresh frames occur in the same input frame. In embodiments in which at least one encoder is utilizing bypass functionality, the IDRs for the lower resolution encodings should align with the IDRs found in the original encoded source content. In another example, the ingress node 122 can add supplemental content, such as advertisements, where markers are present in the unencoded content.

At block 814, the ingress node 122 makes the processed unencoded content available for encoding. For example, the ingress node 122 can store or cache the unencoded original content for access by the egress nodes 124. Illustratively, a first encoder, such as encoder 124A, can utilize the stored original encoded content to implement bypass functionality that reuses the original encoded content (e.g., made available at block 808). In some embodiments, the encoder 124A can further process the original encoded content, such as to add embed captioning information or support burn-in information as described herein. Additionally, a second (and additional) encoder 124B can utilize the unencoded content to encode lower resolution bitrate format combinations (e.g., made available at block 814). In some embodiments, the encoder 124B can further process the decoded original content, such as to synchronize reference frame, add embed captioning information or support burn-in information, as described herein. At block 816, the routine 800 terminates.

Figure 9:
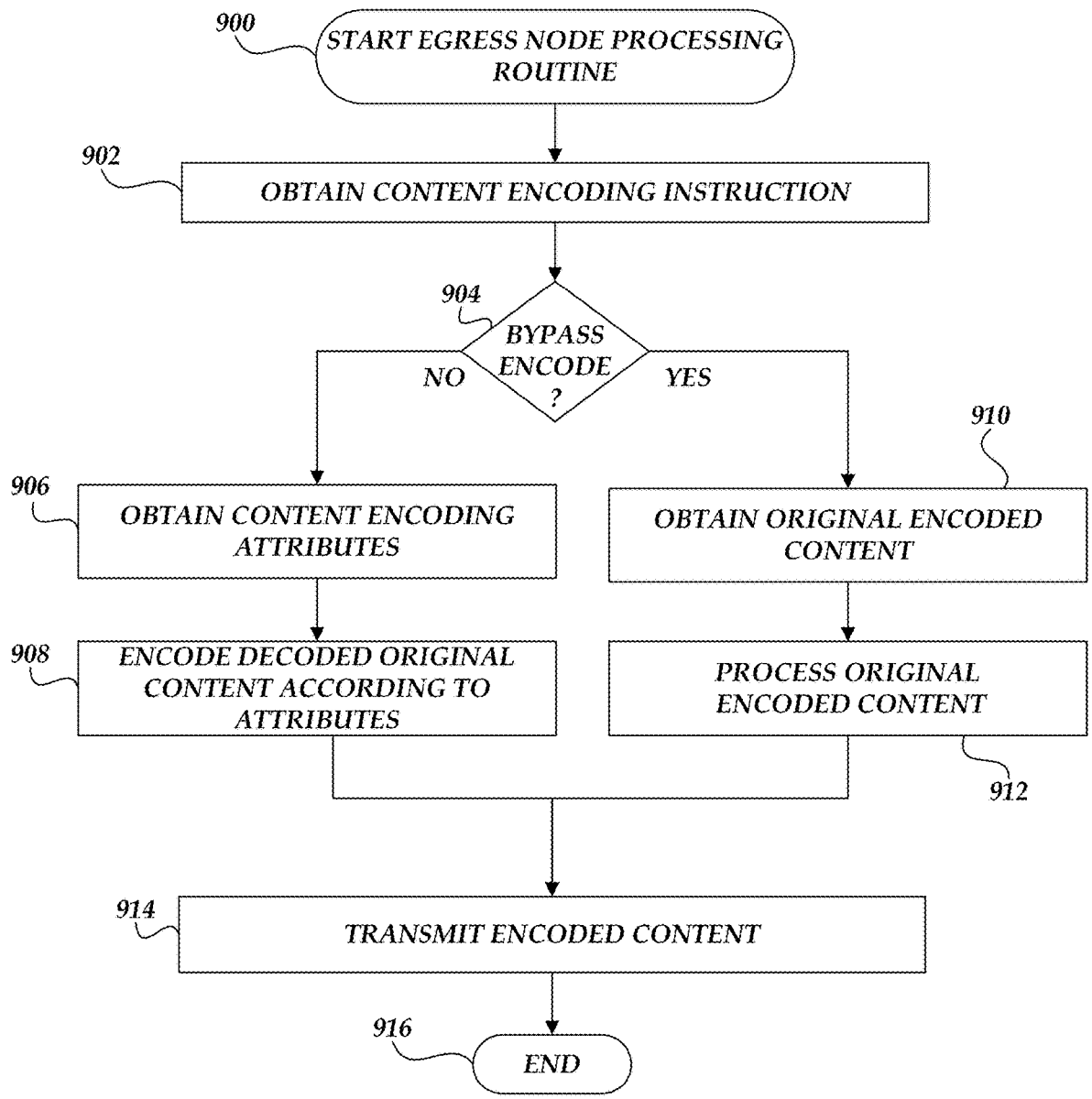
FIG. 9 is a flow diagram illustrative of an egress component routine implemented by a video packaging and origination service.

Turning now to FIG. 9, a routine 900 utilized by the content delivery service 120 for processing incoming original encoded content will be described. Illustratively, routine 900 may be implemented by an egress node 124 or encoding node. Illustratively, routine 900 will begin once the egress node 124 will be provided. At block 902, the egress node 124 obtains instructions to generate encoded content. As described above, illustratively, the content delivery service 120 can determine the encoding profiles that will be utilized to generated multiple encoded versions of the original content, such as to support adaptive bitrate streaming. Additionally, the content delivery service 120 can be configured to specify whether bypass functionality will be utilized, such as to preserve the original encoded content provided by the original content provider 130. At decision block 904, a test is conducted to determine whether bypass functionality will be implemented. Illustratively, the determination of whether bypass functionality will be implemented can be configured by a management component of the content delivery service 120 or ingress node 122. In some embodiments, the egress nodes 124 may be configured to dynamically make the determination of whether bypass functionality should be implemented. For example, the determination of whether bypass functionality will be implemented can be based on the evaluation of criteria, such as quality metrics, processing efficiencies of the encoding nodes, transmission quality, and the like. Based on the evaluation of the criteria, the egress node 124 can determine to not implement bypass functionality. In another example, the content delivery service 120 may receive configuration instructions from the original content provider 130, video packaging and origination service, user, administrator, etc. that specifies whether bypass functionality should be specified or established criteria for dynamically determining whether bypass functionality should be implemented. If not, at block 906, the egress node 124 obtains content encoding attributes at block 906 and encodes the decoded source content according to the attributes.

Alternatively, if bypass functionality will be implemented, at block 910, the egress node 124 obtains the stored encoded source content. At block 912, the egress node 124 further processes the original encoded content, such as to add embed captioning information or support burn-in information.

At block 914, the egress node transmits the encoded content. Routine 900 terminates at block 916.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system to manage encoded content comprising:
one or more computing devices including one or more first hardware processors associated with an ingress component, wherein the ingress component is configured to:
receive an original encoded content stream from an original content provider;
decode the original encoded content stream;
process the decoded content, wherein processing the decoded content includes synchronizing one or more instantaneous decoder refresh frames in the decoded content to match identified instantaneous decoder refresh frames in the stored one or more original encoded content streams;
store the decoded original content stream;
determine to implement bypass functionality based at least in part on attributes of the original encoded content stream; wherein the attributes of the original encoded content stream include one or more of measurement of frame losses, number of user perceptible artifacts, or measurement of compression;
store the original encoded content stream based on the determination to implement the bypass functionality by the ingress component; and
select encoding attributes to identify a plurality of encoding profiles to support adaptive bitrate encoding, wherein the identified encoding profiles include a highest bitrate and one or more lower bitrates relative to the highest bitrate; and
one or more computing devices including one or more second hardware processors associated with a set of egress components, wherein at least a portion of the set of egress components are configured as bypass encoders to implement the bypass functionality, wherein a selected bypass encoder is configured to:
determine to implement the bypass functionality based at least in part on evaluation of criteria, wherein the criteria include one or more of quality metrics, processing efficiencies of encoding components associated with the selected bypass encoder, or transmission quality;
implement the bypass functionality based on at least one of the determination to implement bypass functionality by the ingress component and the determination to implement bypass functionality by the selected bypass encoder; and
generate, based on the implementation of the bypass functionality, a set of encoded segments for adaptive bitrate encoding, wherein generating the set of encoded segments includes utilizing the stored original content to support the highest bitrate of the identified encoding profiles for the adaptive bitrate encoding and utilizing the stored decoded content to support the one or more lower bitrates of the identified encoding profiles for the adaptive bitrate encoding.

2. The system of claim 1, wherein the ingress component is further configured to process the decoded original content stream to synchronize egress components.

3. The system of claim 1, wherein the egress component is further configured to process the stored original encoded content stream to include supplemental content.

4. The system of claim 1, wherein the ingress component is further configured to stop the implementation of the bypass functionality at the bypass encoder.

5. The system of claim 1, wherein the ingress component is further configured to transmit to the original content provider information to modify one or more encoding parameters associated with the original encoded content stream.

6. A computer-implemented method to manage content at a service comprising:
receiving one or more original content streams from a content provider, wherein individual content streams are encoded according to a first encoding profile that corresponds to a highest quality encoding profile of a plurality of encoding profiles used to support adaptive bitrate encoding, the plurality of encoding profiles including one or more lower quality encoding profiles relative to the highest quality encoding profile;
storing the one or more original encoded content streams;
decoding the one or more original encoded content streams to form decoded content;
synchronizing one or more instantaneous decoder refresh frames in the decoded content to match identified instantaneous decoder refresh frames in the stored one or more original encoded content streams;

making the stored one or more original encoded content streams and the decoded content available to a set of egress components;

determining, by at least one ingress component, to implement bypass functionality based at least in part on attributes of the one or more original encoded content streams, wherein the attributes include one or more of measurement of frame losses, number of user perceptible artifacts, or measurement of compression; and determining, by at least one egress component, to implement the bypass functionality based at least in part on evaluation of criteria, wherein the criteria include one or more of quality metrics, processing efficiencies of the at least one egress component, and transmission quality;

wherein, based on at least one of the determination of the at least one ingress component and the determination of the at least one egress component, the at least one egress component implements the bypass functionality by utilizing the stored one or more original encoded content streams to support the highest quality encoding profile of the adaptive bitrate encoding and by utilizing the decoded content to support the one or more lower quality encoding profiles of the adaptive bitrate encoding.

7. The computer-implemented method of claim 6, wherein processing the decoded content streams further includes aligning one or more frames of the decoded content streams based on markers for inserting supplemental content.

8. The computer-implemented method of claim 6 further comprising processing the stored one or more original encoded content streams.

9. The computer-implemented method of claim 8, wherein processing the stored one or more original encoded content streams includes overlaying supplemental content with the stored one or more original encoded content streams.

10. The computer-implemented method of claim 8, wherein processing the stored one or more original encoded content streams includes partially re-encoding the stored one or more original encoded content streams to add supplemental content.

11. The computer-implemented method of claim 6 further comprising selectively stopping the bypass functionality.

12. The computer-implemented method of claim 6 further comprising transmitting a modification of at least one encoding parameter to the original content provider.

13. The computer-implemented method of claim 6, wherein the stored one or more original encoded content streams correspond to a highest quality encoding bitrate.

14. A computer-implemented method to manage transmission of content comprising:

receiving one or more original encoded content streams from a content provider, wherein individual content streams correspond to content encoded according to an encoding profile of a plurality of encoding profiles supporting adaptive bitrate encoding;

processing the received original encoded content streams and decoded content streams to make the received original encoded content streams and the decoded content streams available to a set of egress components, wherein processing the decoded content streams includes synchronizing one or more instantaneous decoder refresh frames in the decoded content streams to match identified instantaneous decoder refresh frames in the received original encoded content streams;

wherein at least one ingress component determines to implement bypass functionality based at least in part on attributes of the one or more original encoded content streams, wherein the attributes include one or more of measurement of frame losses, number of user perceptible artifacts, or measurement of compression and wherein at least one egress component determines to implement the bypass functionality based at least in part on evaluation of criteria, wherein the criteria include one or more of quality metrics, processing efficiencies of the at least one egress component, and transmission quality; and determining to implement bypass functionality in response to at least one of the determinations of the at least one ingress and egress components, wherein, based on the determination to implement bypass functionality, the at least one egress component of the set of egress components utilizes the received original encoded content streams without encoding the decoded content streams to generate streaming content having a highest bitrate of the plurality of encoding profiles supporting the adaptive bitrate encoding and other egress components of the set of egress components utilize the decoded content to generate a set of encoded segments having lower bitrates relative to the highest bitrate supporting the adaptive bitrate encoding.

15. The computer-implemented method of claim 14 wherein processing the decoded content streams synchronizes subsequently encoded content with the received original encoded content streams.

16. The computer implemented method of claim 14, wherein processing the decoded content streams includes at least aligning one or more frames of the decoded content streams based on markers for inserting supplemental content.

17. The computer-implemented method of claim 14 further comprising processing the received original encoded content streams to incorporate additional content into the received original encoded content streams.

18. The computer-implemented method of claim 17, wherein processing the received original encoded content streams includes at least one of overlaying supplemental content with the received original encoded content streams or partially re-encoding the received original encoded content streams to add supplemental content.

19. The computer-implemented method of claim 14 further comprising selectively stopping the bypass functionality.

20. The computer-implemented method of claim 14 further comprising transmitting a modification of at least one encoding parameter to the original content provider.

\* \* \* \* \*